United States Patent [19]

Eberle et al.

[11] 4,359,075

[45] Nov. 16, 1982

[54] MULTIPLE POSITION AND WORK STATION FOR BATTERY FABRICATION

[75] Inventors: William Eberle; Kelly L. Eberle, both of Reading, Pa.

[73] Assignee: General Battery Corporation, Reading, Pa.

[21] Appl. No.: 149,268

[22] Filed: May 12, 1980

[51] Int. Cl.³ ............................................. B65B 3/04
[52] U.S. Cl. .................................. 141/177; 141/238; 141/283; 141/94; 408/46
[58] Field of Search .................................... 141/94–96, 141/129–198, 234–248, 250–284, 285–310, 98, 1–12; 408/42, 43, 46

[56] References Cited

U.S. PATENT DOCUMENTS

| | | | |
|---|---|---|---|
| 3,857,422 | 12/1974 | Cunningham et al. | 141/177 |
| 3,934,624 | 1/1976 | Eberle | 141/238 |
| 3,999,581 | 12/1976 | Eberle | 141/238 |
| 4,010,780 | 3/1977 | Eberle | 141/238 |
| 4,185,943 | 1/1980 | Hautau | 408/46 |

Primary Examiner—Houston S. Bell, Jr.
Attorney, Agent, or Firm—Benasutti Associates, Ltd.

[57] ABSTRACT

A multi-positionable work station containing a plurality of easily reciprocally, positionable work station blocks is disclosed. As shown, each of said blocks is adapted to receive one of a variety of tools and is further adapted to be locked in place by an integral quick camlock contained within said station. A use of the station is illustrated with an acid-fill station which will simultaneously fill each of the cells in a multi-celled electric storage battery for automotive use with battery acid. In the embodiment shown, the station is adjustable vertically without the necessity to disassemble the apparatus to which the station is attached and further contains structure to adjust the forward and rear position of the batteries being filled relative to the work station so that precise alignment may be achieved.

13 Claims, 6 Drawing Figures (FRONT ELEVATION)

FIG. 3 (FRONT ELEVATION)

FIG. 5 (TOP VIEW OF FIGURE 3)

MULTIPLE POSITION AND WORK STATION FOR BATTERY FABRICATION

BACKGROUND OF THE INVENTION

This invention relates to battery processing and manufacturing and more particularly to an apparatus adapted to position a plurality of tools in particular positions relative to a battery which is being processed therein. The specification and description of this apparatus are made with particular reference to equipment adapted for filling batteries with an electrolytic fluid such as a solution of sulfuric acid in water known as battery acid. However, this is purely by way of illustration and it should be understood the subject invention as hereinbelow described, is adaptable to a variety of applications wherein it is necessary to position precisely a set of tools which are used to perform a particular fabrication step in the assembly of multi-celled lead acid storage batteries for use in automotive, industrial and commercial applications.

In the manufacturing and the processing of batteries, a number of general manufacturing goals are always sought. In regard to acid filling operations and in other similarly constituted manufacturing steps, it is highly desirable that the machinery involved be designed with substantial structural versatility so that batteries of varying configurations and sizes may be efficiently processed therein. Secondly, where acid filling is involved, it is important that the correct amount of acid be meted into each of the individual battery cells so that proper operation of the finished product will be achieved.

The prior art shows many attempts at realization of these general goals for an acid filling and similar types of battery processing equipment such as that shown in my prior U.S. Pat. No. 3,999,581. However, none of these is completely effective in all respects. For example, one type of acid filling apparatus involves the use of one or more pumps which transfer acid from a storage tank through a manifold into the battery cells. In addition to involving significant mechanical reliability and corrosion problems, such an approach also requires a rather sophisticated adjustment mechanism in order to provide the volumetric adaptability required. Moreover, if a crimp or blockage occurs in one or more of the manifold outlet lines, one or more of the cells will either be underfilled or overfilled. In still other designs it is necessary that the part of the processing equipment which physically makes contact with the batteries must be manually adjusted, usually through the use of templates, and clamped in place prior to use. While this assures that many potential problems with leakage and spillage will be minimized, it is also found that the necessity to physically locate and individually clamp each of the nozzles in the template prior to its being used is both extremely time-consuming and, to a certain extent hazardous to the operating personnel.

Furthermore, when templates are used, one is limited to the number of position sets established by it. In my U.S. Pat. No. 3,999,581 the number of sets is three.

Similar comments can be made about equipment adapted to burnish the terminal holes, cast the inter-cell or post connectors, pressure test the cells for intercellular or wall leaks, electrically test the assembled battery for lack of cell-to-cell continuity or intercellular short circuits or with any other battery processing apparatus where it is necessary to make contact in a particular manner or at a particular place.

The present invention is directed to provide a simplified high-speed multiple position work station having a plurality of station blocks, each adapted to hold a fabrication tool, and which is adaptable to quick and safe positional variation for use with acid filling and other apparatus utilized for the production line fabrication of automotive and industrial multi-celled, lead acid storage batteries.

SUMMARY OF THE INVENTION

As noted above, the subject of this invention is a multiple position work station. While the balance of this discussion will be with reference to an acid filling apparatus, this is purely by way of illustration and is not intended to foreclose the application of this invention to other types of battery processing equipment.

The work station itself comprises a plurality of station blocks, each of which is adapted to hold a tool for use in performing a fabrication step on a battery and further being reciprocally mounted on horizontal shaft means so that the station blocks can be individually adjusted to particular work positions along the top of a battery. Cooperating with the station blocks is a quick camlock adapted to clamp as a unit all of the station blocks after they have been placed in position and adjustment means for changing the horizontal and vertical disposition of the work station so that it can be adapted to operate over different sized batteries. As currently configured, the shaft means and camlock both fit into a pair of end brackets which are in turn attached to the processing apparatus by the vertical adjustment means. This allows the easy raising and lowering of the work station without the necessity of making other adjustments in the equipment. Of course the shaft used must be of such diameter that it can support not only the weight of station block but any attached tooling as well without appreciable sagging. The clamp means is, in the preferred embodiment, a rotatable cam shaft, adapted to simultaneously engage and clamp each work station block when it is rotated into an inner or first position so that they are locked in place and further to disengage and release the blocks for further adjustment when it is rotated outwardly into a second position.

As noted, one application of this apparatus is in conjunction with a system adapted for filling completed lead acid multi-celled batteries with an electrolytic battery acid solution prior to charging them to their working voltage. One device for doing this is illustrated in my U.S. Pat. No. 4,010,780, which is incorporated by reference, and shows an acid-filling apparatus adapted to transport, on a roller mechanism, one or more multi-celled batteries and then to simultaneously fill each of the cells therein with a premeasured aliquot portion of battery acid. To assure that the filling is done correctly, this apparatus incorporates a set of movable holders for individual nozzles which are designed to fit into the cell filling caps and conduct the battery acid therethrough. At present, these must be positioned precisely by the use of template means which fit onto the front faces of the nozzle holders and establish the correct nozzle spacing for the different sized batteries being processed. In use, it is physically bolted to each one of the nozzle holders to lock them in proper operating position during the repetitive filling operations performed on a given set of batteries. When a new set of batteries having different dimensions is to be processed, it is then necessary to unbolt the template, adjust the holders to the correct fill positions thereover, and then rebolt the template before processing is restarted. It has been found, in practice, that the use of such an adjustment system is both time-consuming and creates somewhat of a safety hazard to the operators working thereon due to problems with exposure to rather corrosive acid drippage.

Similar types of problems are encountered in other battery processing equipment, especially that involving the casting of the lead intercell connectors and binding posts. The present invention is intended to correct these problems by providing a quick adjustable, fast locking work station apparatus adapted to reduce both equipment downtime and operator exposure to hazardous working conditions.

The acid-filling operation, per se, is performed with a gravity feed system of a type which has been shown to have a high degree of accuracy and adaptability as to the volume of acid transferred. This employs a ladling mechanism which, after having been immersed into an associated storage tank of battery acid, is then raised to a level above the battery being filled so that the acid can drain out of the ladle into the battery. Individual cell filling accuracy is assured by using as a ladle, a casing configured similarly to the battery itself, that is, it is divided into a plurality of internal cavities which match the number of cells in the battery or batteries being filled. The actual volume required will vary over a wide range depending on the current capacity and operating characteristics of the batteries in the set being processed. To permit the precise selection of the proper aliquot portion of acid needed, the ladle is tiltable for pre-adjustment of its contents.

It has been found that even under the best of conditions there is a certain amount of acid drippage and spillage. This normally spills out onto the roller drive mechanism and can be quite deleterious to the roller drive chains and other components of the system. To prevent this from happening, acid proof conveyors have been developed. One type of such a conveyor is shown in my copending application Ser. No. 894,349, "Acid Proof Conveyor", filed Apr. 7, 1978 and such application is hereby incorporated herein by reference.

Thus, it is the principal object of the subject invention to provide an adjustable multi-block work station, said blocks being adapted to quickly assume variable work positions over a battery being processed.

It is a second object to provide a work station which is capable of being locked in said work positions with a minimum of effort and without the need for external positioning means such as a template.

It is yet a further object to provide a work station which can accept a variety of working tools.

Other and further objects of the subject invention will be illustrated more clearly in the following detailed description, taken in conjunction with the appended figures.

BRIEF DESCRIPTION OF THE DRAWINGS

FIG. 5 is a top view of the acid filling station as shown in FIG. 3.

DETAILED DESCRIPTION OF THE INVENTION

Figure 1:
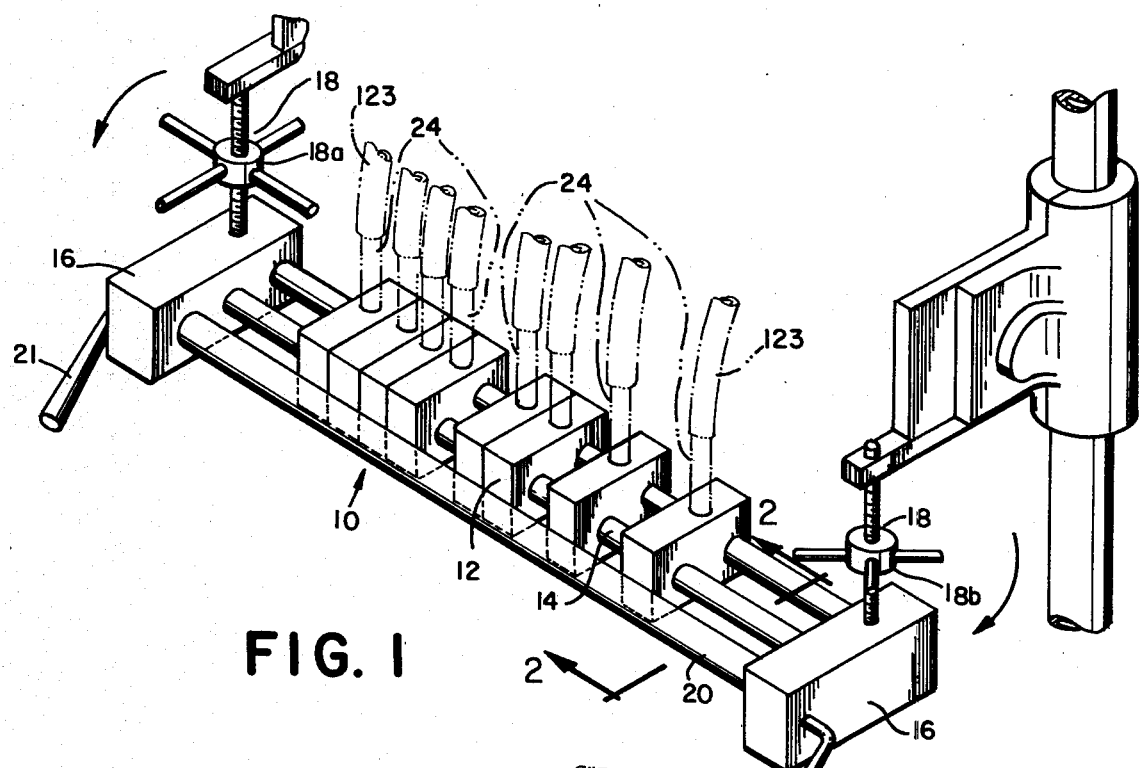
FIG. 1 is an isometric view of a work station according to the present invention.

Referring now to FIG. 1, we see an isometric view of a preferred embodiment of a multi-positionable work station 10 according to the present invention. As shown it comprises a plurality of more or less rectilinear work station blocks 12 which are slideably mounted on horizontally disposed parallel shaft means 14 in such a manner that the individual blocks 12 can be sited thereon anywhere along its length. The ends of the shafts 14 are fixed into a pair of mounting blocks 16, which in turn are mounted onto vertical elevation adjustment means 18. This is connected to the apparatus of which the station is a part.

Both the vertical adjustment of the work station itself and the horizontal adjustment of the blocks within the station can be accomplished without significantly interferring with the overall operation of the apparatus. That is, adjustment of the station does not require major disassembly or, unless associated tooling must also be changed, extensive down time. A major part of this ability is the relationship of the slideable station blocks 12 and quick camlock 20 which is also disposed between mounting blocks 16, said lock further having a fixed handle 21 at each end. The interrelationship of the station blocks 12, shaft means 14 and camlock 20 is more clearly shown in FIG. 2, which is a cross-section of work station 10. As shown, shaft means 14 fits through a pair of horizontal mounting holes 22 situated within each of work station blocks 12. This stabilizes them while leaving the central portions of the blocks clear for tool mounting which is done within each block through a vertical tool hole 23 drilled therethrough. This hole can be adapted to hold a wide variety of working tools 24; in the acid-filling apparatus illustration used herein, it is an acid fill nozzle, but it could easily be any one of a large number of other types of tools routinely used in processing batteries.

Rotatably disposed along the front surface of the station blocks is camlock 20. As shown, this is an eccentric circular shaft disposed within the station so that it rotates on an off-center axis. Camlock 20 is covered with a resilient tube or coating 25 to engage and firmly hold each block in position. When handle 21 is rotated upwardly, lock 20 itself rotates to an inwardly disposed first position so that it bears against the adjusted work station blocks to clamp them in place. Conversely, when handle 21 is rotated downwardly, camlock 20 rotated to an outwardly disposed second position and disengages the station blocks so that they are free to be moved to new positions. As configured, the normal fit between camlock 20, work station blocks 12, and shaft means 14 is such that the frictional bearing forces developed will be adequate to firmly clamp blocks 12 in the working positions selected without the necessity of either bending the shaft inwardly or distorting the work station in any other way. Thus, when it is necessary to adjust the work station to the needs of a particular battery configuration, it is a simple matter merely to place an unfilled battery underneath the work station, unclamp the station blocks and adjust them over the battery to the proper operating positions by sliding them along shaft means 14 and then reclamping them.

Should it be necessary to adjust the vertical disposition of the work station, this can be simply done with vertical elevation adjustment means 18. In the preferred embodiment, this comprises a pair of manually operated, easily turnable screws 18a and 18b, threadably attached to the machine frame and adapted so their rotation, acts to raise or lower the entire work station. To help the operator in performing such adjustment expeditiously, the two screws rotate inwardly in opposite directions as the operator faces the station, that is, one is a left-handed screw and the other is a right-handed screw. In most battery processing applications the station is narrow enough so that the operator can reach both of the screws simultaneously. This allows him to easily turn both screws together with minimum effort as the direction of screw rotation matches the normal rotational motion of his right and left hands. Once the adjustment is completed and the station components locked in place, the normal vibrational environment associated with most battery processing machinery will not disturb the station settings and the fabrication operation can then proceed with a minimum of unexpected delay.

Figure 3:
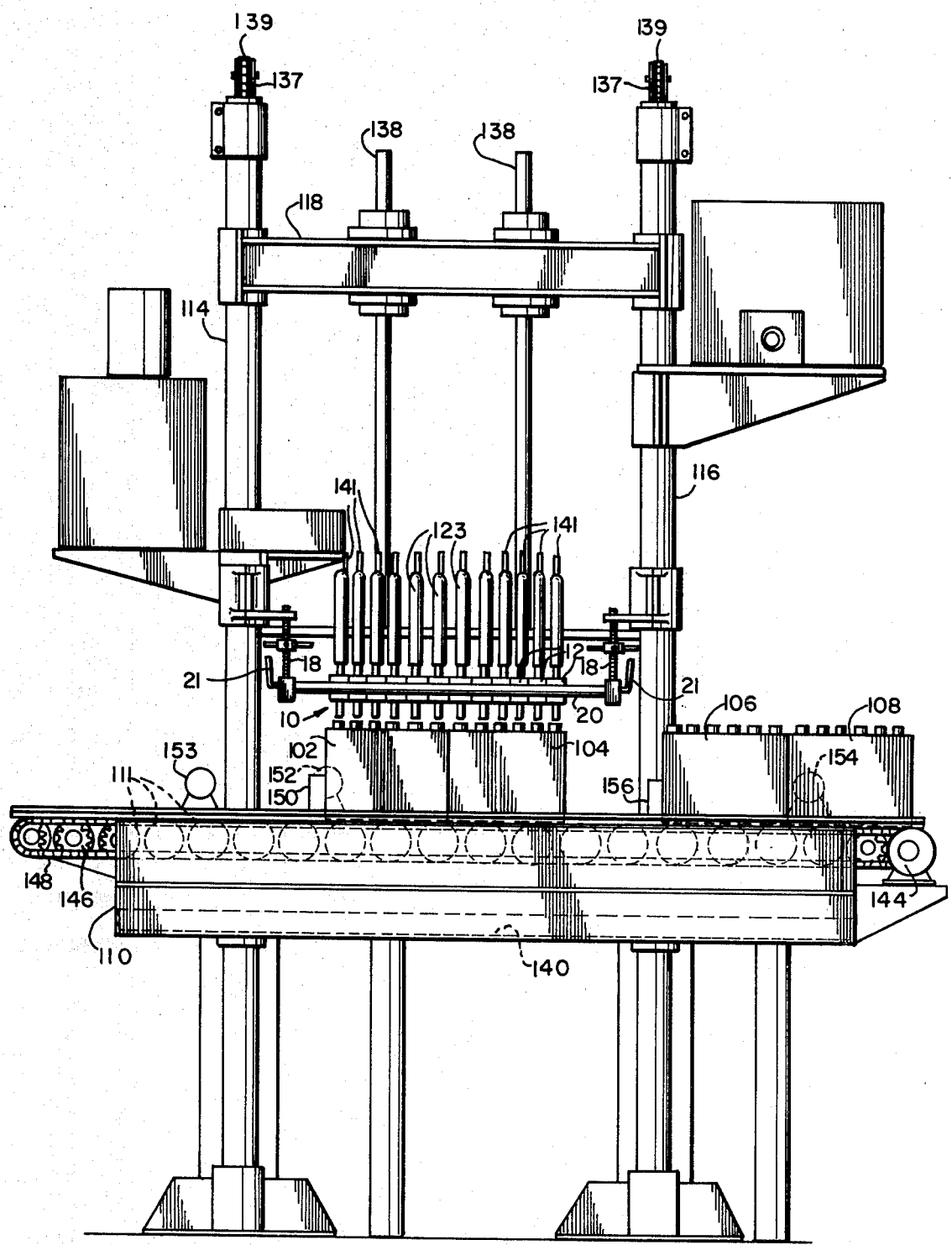
FIG. 3 is a front view of an acid filling apparatus incorporating the work station of FIG. 1.
Figure 4:
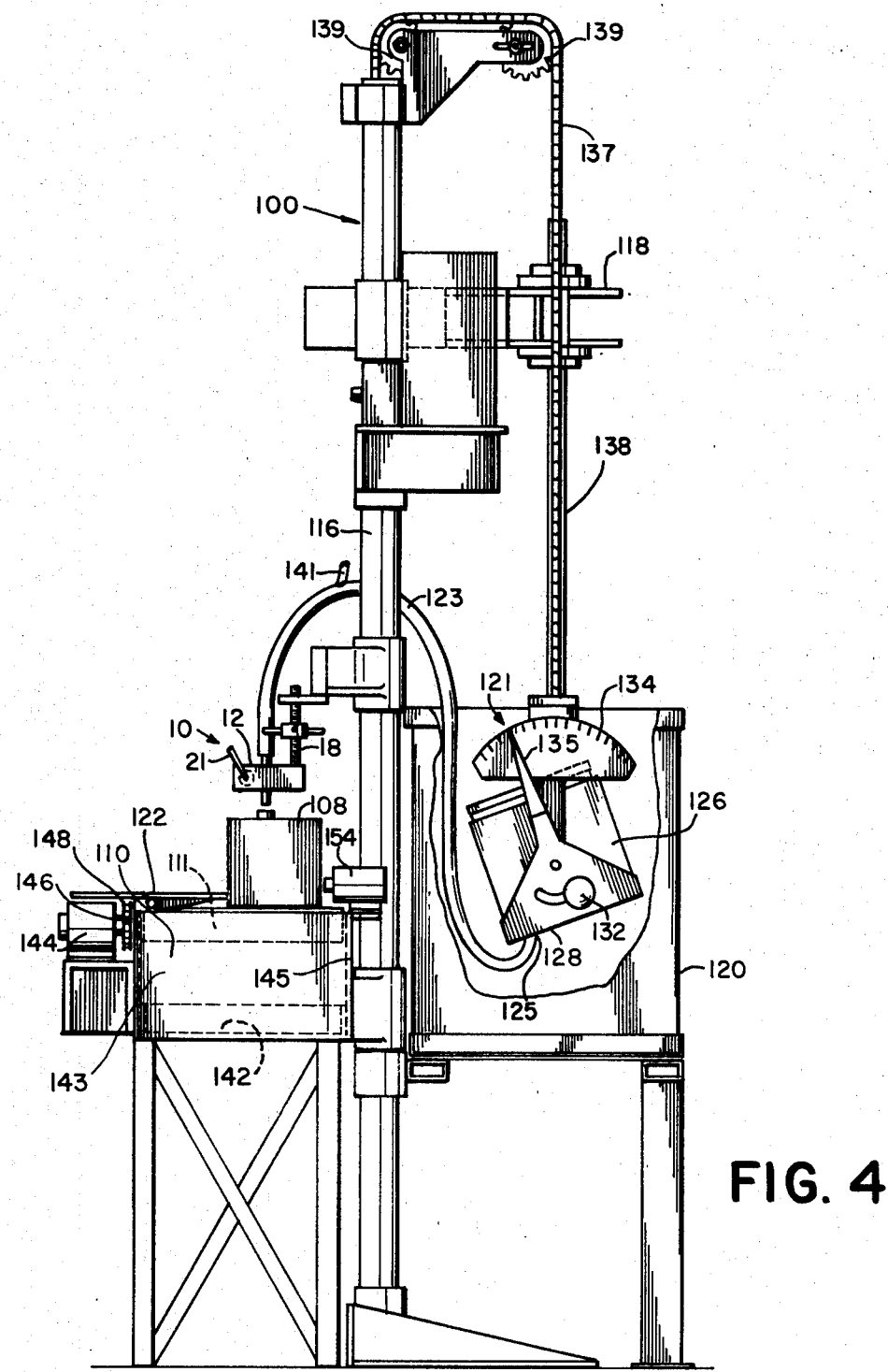
FIG. 4 is a sideview of an acid filling station as shown in FIG. 3.

It was noted hereinabove that the operation of the subject work station would be illustrated in connection with a battery acid filling apparatus. In its total configuration, such apparatus involves the receipt and positioning of one or more batteries for filling, the generation of a predetermined aliquot volume of acid, the delivery of said volume through a plurality of nozzle assemblies into the individual battery cells and finally, the subsequent exiting of the filled batteries from the apparatus for further processing. The fundamental features of this apparatus, plus several ancillary ones, which assure effective operation of the acid filling operation are embodied in an apparatus shown in FIGS. 3, 4 and 5 which are front, side and top views of such an apparatus.

Referring now to these Figures, we see an acid-filling apparatus 100. For purposes of illustration, four batteries are shown, designated 102, 104, 106 and 108 respectively. The first two batteries, 102 and 104, are shown in position to be filled while the second two batteries, 106 and 108, are positioned such that they will be the next ones to be filled. The batteries generally move along transport means 110 which is defined by a plurality of mutually driven rollers 111 which form a conveyor over which the batteries move. Station 100, within which the battery filling operation is conducted, is defined by a frame comprising a pair of vertical, upright hollow structural members 114 and 116 connected together by one or more horizontal crossarm members 118.

At the rear of apparatus 100 is an acid storage tank 120 which holds a supply of acid or other appropriate electrolytic fluid which is to be transferred into the batteries. The actual amount of acid transferred is established by metering means 121 which premeasures the aliquot portions of acid needed for each cell being filled and transfers them from the tank to the battery.

Figure 2:
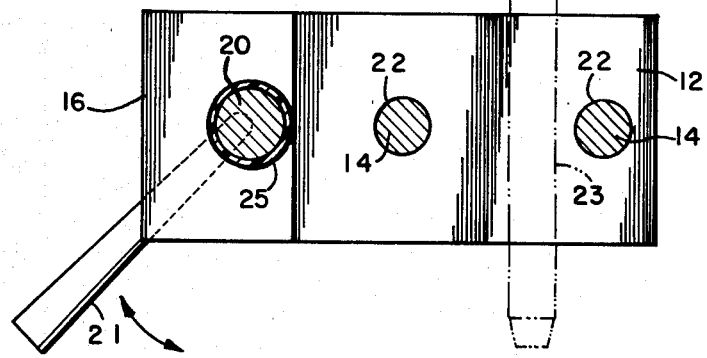
FIG. 2 is a cross-section of the work station as shown in FIG. 1 along the line 2—2.

Attached between upright members 114 and 116 is work station 10 which is horizontally and vertically adjustable as hereinabove described. In this station, the fill position is normally set so that the outlets of nozzles 24 are just above the individual cell filling holes of batteries 102 and 104. This is important, since it allows quick battery entry and exit and further promotes free entry of the battery acid into the cells while allowing the air within them to escape freely with minimum of spray being carried out. This spray-free operation is further facilitated by slightly reducing the nozzle outlets in diameter so that the air stream annulus around the flowing acid is as large as possible thus permitting the air to flow out of the cells with a minimum of spray generating turbulence. This is shown in FIG. 2.

As noted, it is important that the nozzle outlets be directly over the cell inlets for proper operation of acid-filling apparatus 100. The work station as described hereinabove is adequate to do this where the only variability between consecutive sets of batteries is in length or height. However, it is also possible that the batteries will vary in width as well and when this happens, the alignment of the nozzle outlets and cell inlets will not be correct. It is known that in most battery manufacturing facilities, the number of width variations which must be accommodated is far smaller than the number of length and height variations encountered; in fact, for most of the foreseeable applications, the number of widths involved will be two. To handle this variation, the work station further includes a horizontal front to rear position adjustment capability which in the preferred embodiment comprises channeling flap 122 which is pivotally attached to transport means 110. Depending on which one of the two battery width configurations is being processed, flap 122 is either raised or lowered. In the raised position, the battery proceeds to the normal filling position as hereinabove described. When lowered, it shunts the battery sideways for a sufficient distance on the conveyor such that the battery fill holes will fall precisely in alignment with the nozzles for correct filling.

Figure 6:
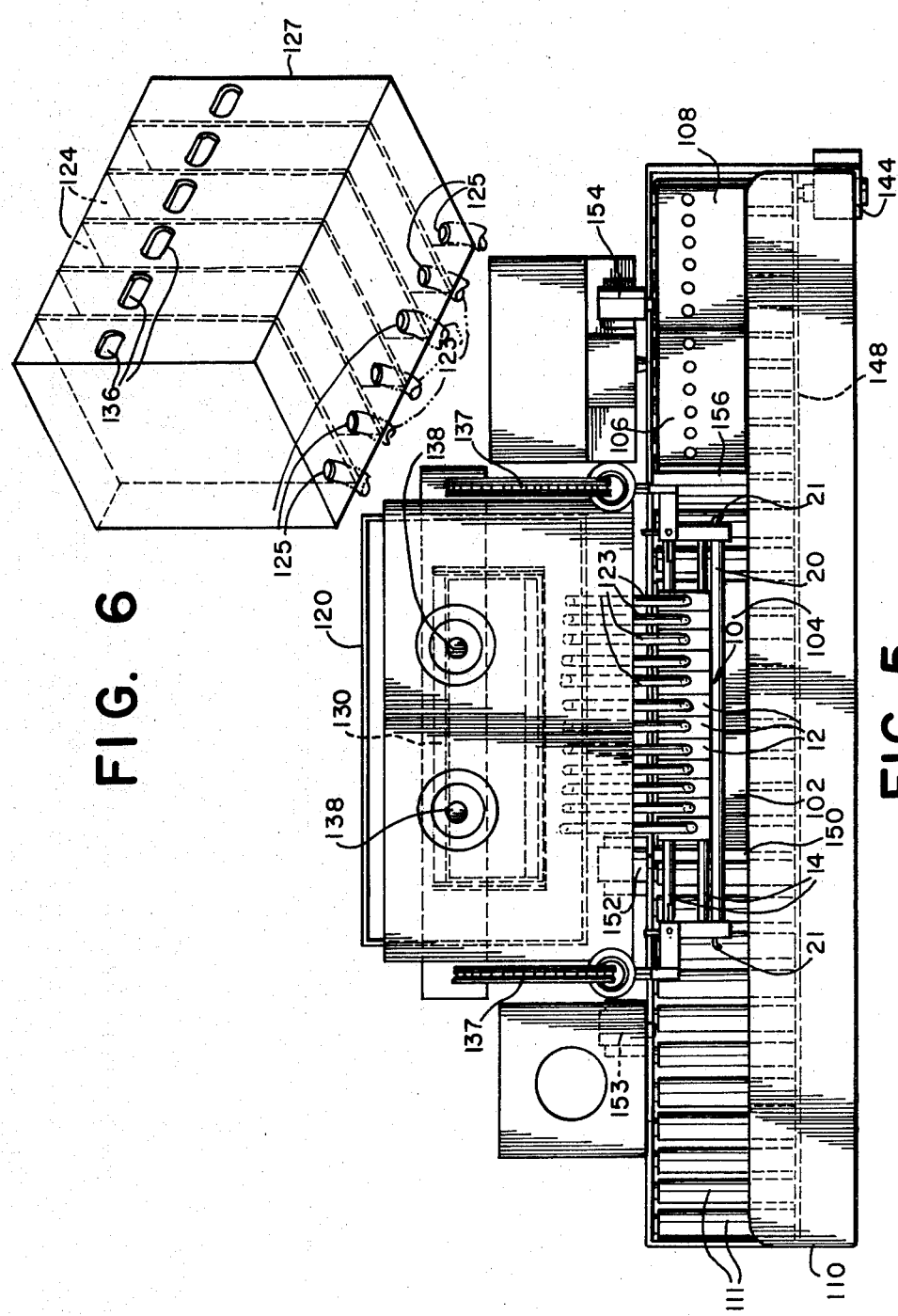
FIG. 6 is an isometric view of an acid metering container for the acid filling station shown in FIG. 3.

The acid is conducted to each of nozzles 24 by dispensing means which comprises a plurality of flexible tubes or hoses 123, coming from metering means 121. As shown in FIG. 6, each of these runs through the apparatus to one of a plurality of outlet ports 125 in the bottom of chambers 124 in ladling means 126. This is a more or less rectilinear open-topped shell 127, generally made from one or more empty battery cases, having a plurality of chambers which matches the number of cells in the battery or batteries being filled. It sits on pivotable table 128 which may be rotated to some angular aspect and locked to a fixed member 130 by lock means 132, said angle being projected on template 134 by a pointer 135, said rotation fixing the quantity of acid which is accumulated in each of chambers 124. Any excess acid therein drains out of a drainage port 136 in the downwardly disposed side of each chamber.

This drainage is facilitated by lifting means 138 which are attached to table 128, said lifting means being adapted to raise and lower said table. As configured, this comprises a pair of air cylinders (not shown), one in each of hollow vertical members 114 and 116 and which are connected by a pair of flexible wire or chain cables 137, each of which travels over a pulley or sprocket 139, attached to the top of upright members 114 and 116 to a side portion of shell 127. Lifting is accomplished by retracting the pistons of the cylinders to pull in cables 137. This should be done smoothly to avoid unnecessary shocks and spillage.

The actual acid loading cycle is started only after the requisite number of batteries are in the proper position for filling. It begins with the raising of table 128 which had been previously lowered into tank 120 so that the open top of shell 127 was below the surface of the acid therein, and each of its chambers filled. As soon as the chamber drainage ports 136 are above the surface of the acid in the tank, any excess fluid in the chambers drains out of drainage ports 136 and only the correct aliquot portions of acid necessary for the batteries being filled remain therein. Continued raising of table 128 eventually raises the bottom of shell 127 to a point which is above the vent holes in the batteries being filled. When this occurs, the force of gravity causes the acid within chambers 124 to flow out through ports 125, hoses 123 and nozzles 24 into the batteries 102 and 104 without more. After a preset time, which is selected to be sure that all of the acid within the chambers flows into the batteries, the driver air cylinders are extended which lowers table 128 back into tank 120. By so doing, a suction force is created which acts to prevent any drippage from flowing out of the nozzle onto the conveyor rollers 111 or the batteries being processed. Air check valves/vents 141 in hoses 123 prevent any pressure surges from forcing acid out onto the conveyor. When table lowering is completed, batteries 102 and 104 are now ready to leave the apparatus and batteries 106 and 108 to be admitted, at which time the filling cycle described hereinabove is completed.

The movement of batteries in and out of the apparatus is facilitated by conveyor means 110. An example of such a conveyor adapted for use in equipment of the type herein described is given in my co-pending application Ser. No. 894,349, "Acid Proof Conveyor", filed Apr. 7, 1978, such application being hereby incorporated herein by at reference. This comprises an open-topped acid-proof trough means 140 adapted to collect any liquids spilled during the battery filling cycle. Trough means 140 is in the form of a rectilinear channel comprising sides 141 which are substantially parallel, solid wall members and which are sealed with respect to an inclined bottom which is fitted at its lower end with a discharge fitting, (not shown), for facilitating the discharge of any spilled acid collected during the operation of the apparatus. The ends of the trough are sealed against leakage by a pair of end plates 143.

The acid-proof conveying apparatus further comprises a plurality of acid-proof rollers 111 which, in the preferred embodiment, are PVC Schedule 80 rollers which are mounted on stainless steel shafts. The shafts and the rollers associated therewith are disposed within trough means 140 some distance below the open top in a plane substantially parallel to said top and perpendicular to sides 145 of the trough. The stainless steel shafts extend through and are supported with respect to the sides by being fitted with acid-proof bearings made from a material such as silicone filled Teflon, which are referred to by the art as "Rulonn" bearings. This disposition combined with the use of other acid-proof materials such as UMHW ("ultra high molecular weight—polyethylene)" acid-proof plastic material for the construction of the sides and bottom components of trough means 140 creates a working conveyor apparatus which is substantially impervious to contact with acid and adapted to efficiently collect acid, if such is spilled during the operation of the system.

In use, the entire conveying apparatus is generally powered through a single motor 144 which is mounted on the sidewall of trough means 140 and which engages one of the stainless steel shafts, said shaft being somewhat elongated with respect to the remaining shafts of the adjacent rollers to facilitate this connection. Each of the shafts is fitted with a sprocket 146 which engages an endless chain 148 which makes contact with both the top and bottom sides of said sprockets to cause them to rotate when motor 144 is actuated. By driving the sprockets 146 in this manner, bearing wear is substantially reduced. This is particularly important since the acid-proof bearings used are mechanically somewhat fragile, so that such reduced wear will preserve the overall integrity of the drive mechanism for considerabley longer periods of time than would otherwise be the case.

To assure the proper operation of the acid-filling apparatus, the system further incorporates a number of control devices adapted to assure that the acid and battery handling subsystems operate with a minimum of difficulty. The first of these operates a stop 150 adapted to position both batteries being filled, directly under the nozzles. As noted above, the fill cycle is deactivated until this sensor indicates that this requirement has been satisfied.

When batteries 102 and 104 are to be admitted into the system, they are transferred from an inlet carrier into usually a conveyor belt, by conveyor means 110 which carries them into the apparatus until they contact stop 150. At this time, transport means 110 stops and first sensing means 152 signals that both batteries have been admitted into the system and secondly, that they are in the proper positions under the work station 10 prior to the start of the fill cycle. It is only if and when these two conditions are met that table 128 is actuated to start the filling cycle described hereinabove.

After the fill cycle is complete and metering means 121 is lowered back into tank 120, stop 150 is opened and the now filled batteries are transferred out of the filling apparatus by reactivated conveyor means 110. Their exit from the system is detected by a second sensing means 153 located down stream from stop 150 and which counts the batteries as they pass through. When the second battery has successfully exited the system, the second sensing means recloses stop 150, activates third sensing means 154 and opens entry gate 156 which is at the entrance to apparatus 100 and which in the closed position blocks off batteries 106 and 108. As currently configured gate 156 is adapted so that it will not open unless at least two batteries are available for entry.

It was noted above that work station 10 need not be limited to the acid fill operation described above. Rather, it is adaptable to many other applications where it is necessary to simultaneously perform a set of operations on or in the cells of a given battery. Examination of the battery art shows that there are many situations where this is necessary. For example, the burnishing of the positive and negative post holes prior to the casting of the exterior post connectors, and the placing of the post builder means to perform the actual casting operation itself are conducted in types of machines wher the ability to quickly adjust the location of the tooling needed to perform these operations in the plurality of cells in the battery is highly advantageous. Other applications wherein such a capability would be useful would be in those instances where it is necessary to pressurize the individual cells to test for intercell and post hole leak tightness and wall integrity of the battery through its series connected cells, the placement of electrodes to make continuity tests between the positive and negative posts and short circuit tests between the plates within the stack in each cell, and testing the discharge rate of the battery after preliminary charging. An examination of the battery art will provide many other instances where such an ability would be advantageous. Of course, the station is readily adaptable to multiple tooling operations in other types of equipment not related to battery fabrication and its use for such purposes is anticipated.

It is to be understood that the foregoing suggested apparatus as exemplified by the figures is intended to be illustrative of a preferred embodiment of the subject invention and that many options will readily occur to those skilled in the art without departure from the spirit or the scope of principals of the subject invention as defined in the appended claims.

What I claim is:

1. In an apparatus for the performance of an acid filling step on a battery in one of a succession of sets of similar milticelled electric storage batteries, each of said sets comprising a plurality of individual batteries having dimensions for length, width and height which typically differ from those in the sets of batteries immediately preceding and following in the fabrication process, said apparatus comprising one of a plurality of steps wherein said fabrication step comprises a work operation performed more or less simultaneously in each cell of a battery within the confines of said apparatus, said apparatus further comprising an adjustable multi positionable work station, said work station comprising:
   (a) a plurality of station blocks being adapted to hold an acid filling tool for use in performing said an acid filling step on said battery and further being to slideably reciprocate on horizontal shaft means so on a horizontal axis to particular positions relative to said battery;
   (b) clamp means adapted to lock as a unit said plurality of station blocks after all of said blocks have been adjusted and are in position; and
   (c) vertical adjustment means for moving said work station in a vertical axis so that it can be adapted to operate over different heights batteries.

2. The apparatus of claim 1 wherein said clamp means comprises a rotatable camlock having a resilient coating thereon and adapted to engage each of said adjusted work station blocks when said lock turned to a first position so that they are locked in place and further to disengage and release said blocks for further adjustment when turned into a second position.

3. The apparatus of claim 1 wherein said adjustment means comprises:
   (a) a pair of mounting blocks, one at each end of said horizontal shaft means, said mounting blocks being further adapted to cooperate with said camlock to hold it in said first position; and
   (b) elevation means adapted to change the disposition in said vertical axis of said mounting blocks to as to adjust their position with respect to such batteries.

4. The apparatus of claim 1, further comprising:
   (a) transport means adapted to bring a preselected quantity of said batteries into and out of said work station and to hold said batteries in a proper position relative to said station blocks so that said fabrication step may be performed;
   (b) first sensing means adapted to deactiviate said apparatus until said transport means has moved said batteries into said proper position;
   (c) second sensing means cooperating with said transport means and positioned to detect the exit of said batteries from said work station after said fabrication step is completed; and
   (d) third sensing means controlling an entry gate to admit said quantity of batteries into said work station, said third sensing means cooperating with said second sensing means so that said gate will not open until all of the batteries previously within said work station have exited therefrom.

5. The apparatus of claim 3 wherein said adjustment means further comprises means adapted to change the relative front to rear position of said battery within to said work station.

6. The apparatus of claim 1 further comprising liquid fill means, said fill means comprising:
   (a) metering means adapted to automatically draw out from a storage container a plurality of premeasured aliquot portions of liquid one portion for each of said cells in said battery;
   (b) dispensing means comprising:
      (i) a plurality of flexible tubes disposed between said metering means and said station blocks, said tubes being adapted to receive said aliquot portions and transmit them to said battery cells; and
      (ii) a plurality of hollow nozzles, each one being connected at an upper end to one of said flexible tubes and further being attached to one of said station blocks so that it can be moved therewith when the position of said station block is adjusted to the dimensions of a particular battery, said nozzle further having a reduced section at its lower end said reduced section being adapted to fit within the opening above each of said cells so that said fluid may enter said cell and the air therein can be freely displaced.

7. The apparatus of claim 6, wherein said metering means comprises:
   (a) ladling means, said means comprising an open topped casing having a bottom portion and side portions and further being internally divided into a plurality of separated, independent open topped chambers corresponding to the total number of cells in the batteries within said work station which are being filled with liquid, said bottom portion having a plurality of gravity flow outlet ports, one for each of said chambers, said ports being adapted to receive an end of one of the said tubes, and said side portions containing at least one downwardly disposed drainage port for each of said chambers to independently limit the liquid fluid content of each chamber of said ladling means to said aliquot portion;
   (b) means for adjusting and tilting the aspect of said ladling means so that it can be rotated to any of a variety of predetermined angles, whereby the overflow of liquid from each of said drainage ports caused by said tilted aspect of said ladling means controls the liquid content of each chamber of said ladling means and consequently the amount of liquid dispensed into its associated battery cell; and
   (c) fixed scale template and pointer means connected to said ladling means, said pointer being pivotable, thereby indicating the degree of tilting of said ladling means on said template.

8. The apparatus of claim 7 wherein said metering means further comprises lifting means adapted to lower said lading means into said storage container to fill said chambers with liquid and then to raise said ladling means to an intermediate position wherein excess liquid drains out of said chambers leaving aliquot portions liquid and then to an upper position wherein the aliquot portions of liquid contained therein flow under the influence of gravity from said ladling means to said batteries, said lifting means cooperating with said first sensing means, so that the cycle of raising and lowering said ladling means will not begin until the batteries being filled are properly positioned within said work station and further cooperating with said transport means so that said batteries are held in this position until all of said liquid has been deposited into said cells.

9. The apparatus of claim 8, wherein said lifting means comprises:
   (a) a frame to support said lifting means, said frame comprising a pair of hollow, vertical supports one on either side of said metering means and having a horizontal cross arm connected to their upper ends disposed more or less over said metering means;
   (b) counter weight means comprising a pair of flexible line connectors, each being attached at one end to one side portion of said casing and, after passing over a pulley rotatably connected to said horizontal member of said frame, being attached at its other end to a weight, said weights being selected so that they are more or less equal to the combined weight of said casing and the liquid containing therein after said casing has received said liquid, said weights further being configured to fit inside one of said hollow upright members in said frame so that they will rise and fall therein as said metering means goes through its cycle; and
   (c) drive means attached to said frame at one end said means being adapted to raise and lower said means as it progresses through its cycle, said drive means cooperating with said first sensing means so that said metering cycle will not begin until said batteries are in the proper position and further to continue said dispensing operation until all of said liquid has been transferred from said ladling means into said battery cells.

10. The apparatus of claim 9, wherein said liquid is a mixture of water and sulfuric acid which is used as the electrolyte to charge said batteries.

11. The apparatus of claim 6 wherein each of said flexible tubes has a check valve/vent therein adapted to relieve pressure surges within said tubes.

12. The apparatus in accordance with claim 1 wherein adjustment means are provided for adjusting said work station in accordance with different width dimension of said battery.

13. An apparatus for depositing preselected aliquot amounts of fluid into each of a plurality of cells within a multicelled storage battery comprising:
   a fixed structural frame;
   a work station assembly, said work station being vertically movable on said frame so that it can be positioned above said battery while it is being filled and further comprising a plurality of horizontally movable work staton blocks, each of which being slideably mounted within said work station and adapted to be positioned over a fill hole within said battery and further containing a nozzle adapted to conduct a mixture of sulfuric acid and water into said fill hole, said nozzle having a reduced outer end so that a turbulent free flow of air out of said cells may be achieved as they are being filled;
   a supply tank to contain said acid mixture;
   ladling means mounted for periodic reciprocal movements between a lower position within said supply tank and an upper position above said battery, said ladling means being adapted to be immersed in said tank to collect said precollected amount of said mixture from said tank in said lower position and being raised from said tank into said upper position wherein said acid mixture drains from said ladling means into said battery;
   means disposed within said ladling means for dividing said fluid from said tank into a plurality of said preselected aliquot portions, one for each cell in said battery, upon movement of said ladling means from said lower position to said upper position;
   fluid transfer means periodically emptying said ladling means and for allowing the independent gravitationally induced transfer of said preselected aliquot portions of fluid into each of said plurality of cells as said lading means moves into said upper position;
   means for tilting said lading means to any of a variety of predetermined angles whereby overflow from said ladling means caused by said tilting correspondingly varies the fluid content of said lading means and consequently, the amount of fluid deposited in said battery, said tilting means further comprising a fixed scale template and pointer means connected to said ladling means said pointer means adapted to pivot with said tilting means and to overlay said template thereby indicating the degree of said ladling means and the quantity of fluid therein;
   transport means adapted to carry said battery into said apparatus for acid filling and after said filling is completed, being adapted to further transport the said batteries out of said apparatus for further processing, said apparatus further comprising a plurality of sensing devices and control means adapted to determine that the requisite number of batteries being filled has been transported into said apparatus and is properly located in said apparatus for further processing, said position being controlled by the location of the stop which acts to prevent the batteries entering the station from leaving until said filling operation is complete, second sensing means adapted to detect the exit of said filled batteries after a filling cycle is complete, said sensing means cooperating with a third sensing means adapted to determine that a sufficient number of batteries for the next filling cycle is available and to control an entry gate which acts to prevent more than the requisite number of batteries from entering the apparatus prior to the start of a filling action.

* * * * *